(12) United States Patent
Blankenship et al.

(10) Patent No.: US 10,383,110 B2
(45) Date of Patent: *Aug. 13, 2019

(54) TIMING ADVANCE GROUP IN LTE SMALL CELL ENHANCEMENT

(71) Applicant: BlackBerry Limited, Waterloo (CA)

(72) Inventors: Yufei Wu Blankenship, Kildeer, IL (US); Shiwei Gao, Nepean (CA); Hua Xu, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/716,027

(22) Filed: Sep. 26, 2017

(65) Prior Publication Data

US 2018/0020439 A1 Jan. 18, 2018

Related U.S. Application Data

(63) Continuation of application No. 14/870,706, filed on Sep. 30, 2015, now Pat. No. 9,844,051, which is a continuation of application No. 13/954,752, filed on Jul. 30, 2013.

(51) Int. Cl.
*H04W 72/04* (2009.01)
*H04W 56/00* (2009.01)

(52) U.S. Cl.
CPC ..... *H04W 72/044* (2013.01); *H04W 56/0005* (2013.01); *H04W 56/0045* (2013.01)

(58) Field of Classification Search
CPC .... H04W 72/04; H04W 74/002; H04W 56/00
See application file for complete search history.

(56) References Cited

U.S. PATENT DOCUMENTS

| 9,844,051 B2* | 12/2017 | Blankenship ..... H04W 56/0045 |
| 2012/0250520 A1 | 10/2012 | Chen et al. |
| 2013/0010711 A1 | 1/2013 | Larsson et al. |
| 2013/0064165 A1 | 3/2013 | Chen et al. |
| 2013/0114505 A1* | 5/2013 | Haim ................. H04W 52/146 370/328 |
| 2013/0114574 A1 | 5/2013 | Ng et al. |

(Continued)

FOREIGN PATENT DOCUMENTS

| KR | 1020140133463 | * 11/2014 | ........... H04W 76/02 |
| WO | 2013057315 A9 | 4/2013 | |
| WO | 2015012557 A1 | 1/2015 | |

OTHER PUBLICATIONS

Machine translation of Korean Patent Application Publication 10-2014-0133463, retrieved from the internet via Google Translate on Jul. 20, 2018. (Year: 2018).*

(Continued)

*Primary Examiner* — Benjamin H Elliott, IV
(74) *Attorney, Agent, or Firm* — Trop, Pruner & Hu, P.C.

(57) ABSTRACT

A method for communication in a wireless telecommunication system is provided. The method includes assigning a first cell of a first network node to a first timing advance group (TAG) of a user equipment (UE) and assigning a second cell of a second network node to a second TAG of the UE, wherein the second network node has a separate MAC (medium access control) scheduler from the first network node, and wherein the UE is able to transmit data on both the first and the second cell.

17 Claims, 11 Drawing Sheets

(56) References Cited

U.S. PATENT DOCUMENTS

| | | |
|---|---|---|
| 2013/0250911 A1 | 9/2013 | Kwon et al. |
| 2014/0050194 A1 | 2/2014 | Gaal et al. |
| 2014/0192775 A1 | 7/2014 | Li et al. |
| 2014/0335882 A1* | 11/2014 | Lee ............... H04W 76/15 455/452.2 |
| 2014/0341188 A1 | 11/2014 | Chang et al. |
| 2015/0024746 A1 | 1/2015 | Adachi |
| 2015/0029955 A1 | 1/2015 | Heo et al. |
| 2015/0036666 A1 | 2/2015 | Blankenship et al. |
| 2016/0021648 A1 | 1/2016 | Blankenship et al. |
| 2016/0174243 A1 | 6/2016 | Park et al. |
| 2018/0020439 A1* | 1/2018 | Blankenship ..... H04W 56/0045 |

OTHER PUBLICATIONS

European Examination Report; Application No. 14832694.5; dated Feb. 9, 2018; 4 pages.
Canadian Office Action; Application No. 2,918,664; dated Nov. 8, 2017; 4 pages.
3GPP TSG RAN #57; "Scenarios and Requirements of LTE Small Cell Enhancements"; RP-121418; Chicago, US; Sep. 4-7, 2012; 6 pages.
3GPP TSG-RAN Meeting #57; "Small Cell Enhancements for E-UTRA and E-UTRAN—Higher-Layer Aspects"; RP-121236; Chicago, USA; Sep. 4-7, 2012; 5 pages.
3GPP TS 36.101 V11.4.0; 3rd Generation Partnership Project; Technical Specification Group Radio Access Network; Evolved Universal Terrestrial Radio Access (E-UTRA); User Equipment (UE) Radio Transmission and Reception; Release 11; Mar. 2013; 401 pages.
3GPP TS 36300 V11.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Mar. 2013; 209 pages.
3GPP TS 36.213 V11.2.0; 3rd Generation Partnership Project; Technical Specification Group Radio Access Network; Evolved Universal Terrestrial Radio Access (E-UTRA); Physical Layer Procedures; Release 11; Mar. 2013; 173 pages.
3GPP TR 36.932 V12.1.0; 3rd Generation Partnership Project; Technical Specification Group Radio Access Network; Scenarios and Requirements for Small Cell Enhancements for E-UTRA and E-UTRAN; Release 12; Mar. 2013; 14 pages.
3GPP TS 36331 V11.4.0; 3rd Generation Partnership Project; Technical Specification Group Radio Access Network; Evolved Universal Terrestrial Radio Access (E-UTRA); Radio Resource Control (RRC); Protocol Specification; Release 11; Jun. 2013; 346 pages.
Roessler, A., et al.; "LTE-Advanced Technology Introduction White Paper"; Jul. 11, 2013; Rohde & Schwarz; 08.2012-1MA169_3E; 41 pages.
Office Action dated Apr. 30, 2015; U.S. Appl. No. 13/954,752, filed Jul. 30, 2013; 17 pages.
Office Action dated Apr. 5, 2017; U.S. Appl. No. 14/870,706, filed Sep. 30, 2015; 24 pages.
Notice of Allowance dated Sep. 6, 2017; U.S. Appl. No. 14/870,706, filed Sep. 30, 2015; 13 pages.
PCT International Search Report; Application No. PCT/CA2014/050705; dated Sep. 23, 2014; 3 pages.
PCT Written Opinion of the International Searching Authority; Application No. PCT/CA2014/050705; dated Sep. 23, 2014; 5 pages.
Canadian Office Action; Application No. 2,918,664; dated Jan. 16, 2017; 3 pages.
European Extended Search Report; Application No. 14832694.5; dated Jun. 1, 2016; 7 pages.
European Communication under Rule 71(3) EPC for Application 14832694.5 dated Jul. 18, 2018, 7 pages.

* cited by examiner

----------Text Proposal to 3GPP TS 36.331:----------
....

maxSecTAG-r11            INTEGER ::= 3    -- Maximum number of secondary TAGs
maxSecTAGExt-r13         INTEGER ::= 3    -- Maximum number of secondary TAGs for small cell
enhancement.

---------- End of Text Proposal----------

--------Changes to 3GPP TS 36.331:--------

– RadioResourceConfigDedicated

The IE *RadioResourceConfigDedicated* is used to setup/modify/release RBs, to modify the MAC main configuration, to modify the SPS configuration and to modify dedicated physical configuration.

*RadioResourceConfigDedicated* information element

```
RadioResourceConfigDedicatedSCell-r10 ::=    SEQUENCE {
    -- UE specific configuration extensions applicable for an SCell
    physicalConfigDedicatedSCell-r10         PhysicalConfigDedicatedSCell-r10   OPTIONAL,  --
Need ON
    ...,
    [[ mac-MainConfigSCell-r11               MAC-MainConfigSCell-r11            OPTIONAL   -- Cond
SCellAdd
    ]]
    [[ mac-MainConfigSCE-r12                 MAC-MainConfigSCE-r12              OPTIONAL   -- Cond SeNB
Add
    ]]
}
```

– MAC-MainConfig

The IE *MAC-MainConfig* is used to specify the MAC main configuration for signalling and data radio bearers.

```
MAC-MainConfigSCE-r12 ::=                    SEQUENCE {
    secTAG-Id-SCE-r12                        SecTAG-Id-r12            OPTIONAL,   -- Need OP
}

SecTAG-SCE-ToReleaseList-r12 ::=  SEQUENCE (SIZE (1..maxSecTAG-SCE-r12)) OF SecTAG-Id-SCE-r12

SecTAG-SCE-ToAddModList-r12 ::=   SEQUENCE (SIZE (1..maxSecTAG-SCE-r12)) OF SecTAG-SCE-ToAddMod-
r12

SecTAG-SCE-ToAddMod-r12 ::=                  SEQUENCE {
    secTAG-Id-SCE-r12                        SecTAG-Id-SCE-r12,
    timeAlignmentTimerSecTAGSCE-r12          TimeAlignmentTimer,
}
SecTAG-Id-SCE-r12 ::=             INTEGER (1..maxSecTAGSCE-r12)

MAC-MainConfigSCE-r12 ::=                    SEQUENCE {
    secTAG-Id-SCE-r12                        SecTAG-Id-SCE-r12          OPTIONAL,   -- Need OP
}
``` secTAG-Id-SCE
Indicates the TAG of an small cell, see TS 36.321 [6]. If the field is not configured for an small Cell (e.g. absent in MAC-MainConfigSCell), the small cell is part of the primary TAG.

secTAG-SCE-ToAddModList, secTAG-SCE-ToReleaseList
Used to configure one or more secondary TAGs related to small cells. E-UTRAN ensures that a secondary TAG contains at least one small cell with configured uplink. If, as part of a reconfiguration that due to small cell release would result in an 'empty' TAG, E-UTRAN releases the concerned TAG.

timeAlignmentTimerSecTAGSCE
Indicates the value of the time alignment timer for secondary TAGs, see TS 36.321 [6].

Figure 10

5.3.10.4  MAC main reconfiguration

The UE shall:

1> reconfigure the MAC main configuration in accordance with the received *mac-MainConfig* other than *secTAG-ToReleaseList* and *secTAG-ToAddModList*;

1> if the received *mac-MainConfig* includes the *secTAG-ToReleaseList*:

2> for each *SecTAG-Id* value included in the *secTAG-ToReleaseList* that is part of the current UE configuration:

3> release the secondary TAG indicated by *SecTAG-Id*;

1> if the received *mac-MainConfig* includes the *secTAG-SCE-ToReleaseList*:

2> for each *SecTAG-Id-SCE* value included in the *secTAG-SCE-ToReleaseList* that is part of the current UE configuration:

3> release the secondary TAG indicated by *SecTAG-Id-SCE*;

1> if the received *mac-MainConfig* includes the *secTAG-ToAddModList*:

2> for each *secTAG-Id* value included in *secTAG-ToAddModList* that is not part of the current UE configuration (secondary TAG addition):

3> add the secondary TAG, corresponding to the *secTAG-Id*, in accordance with the received *timeAlignmentTimerSecTAG*;

2> for each *secTAG-Id* value included in *secTAG-ToAddModList* that is part of the current UE configuration (secondary TAG modification):

3> reconfigure the secondary TAG, corresponding to the *secTAG-Id*, in accordance with the received *timeAlignmentTimerSecTAG*;

1> if the received *mac-MainConfig* includes the *secTAG-SCE-ToAddModList*:

2> for each *secTAG-Id-SCE* value included in *secTAG-SCE-ToAddModList* that is not part of the current UE configuration (addition of secondary TAG of SCE type):

3> add the secondary TAG of SCE type, corresponding to the *secTAG-Id-SCE*, in accordance with the received *timeAlignmentTimerSecTAGSCE*;

2> for each *secTAG-Id-SCE* value included in *secTAG-SCE-ToAddModList* that is part of the current UE configuration (addition of secondary TAG of SCE type):

3> reconfigure the secondary TAG of SCE type, corresponding to the *secTAG-Id-SCE*, in accordance with the received *timeAlignmentTimerSecTAGSCE*;

----------end of Changes to 3GPP TS 36.331:----------------------------------

Figure 10 (continued)

TIMING ADVANCE GROUP IN LTE SMALL CELL ENHANCEMENT

CROSS-REFERENCE TO RELATED APPLICATIONS

This application is a continuation of U.S. patent application Ser. No. 14/870,706 filed on Sep. 30, 2015 entitled, "Timing Advance Group in LTE Small Cell Enhancement", which is a continuation of U.S. patent application Ser. No. 13/954,752 filed on Jul. 30, 2013 entitled, "Timing Advance Group in LTE Small Cell Enhancement", both of which are incorporated by reference herein as if reproduced in their entirety.

FIELD OF THE DISCLOSURE

The present disclosure relates to wireless telecommunications systems and more particularly to timing advance groups for uplink channels in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component may be referred to herein as an eNB, but it should be understood that such a component is not necessarily an eNB. Such a component may also be referred to herein as an access node, a network node, or a network element.

LTE may be said to correspond to Third Generation Partnership Project (3GPP) Release 8 (Rel-8 or R8) and Release 9 (Rel-9 or R9), and possibly also to releases beyond Release 9, while LTE Advanced (LTE-A) may be said to correspond to Release 10 (Rel-10 or R10) and possibly also to Release 11 (Rel-11 or R11) and other releases beyond Release 10 or 11. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 illustrates further modifications that may be made to 3GPP Technical Specification 3GPP TS 36.331, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Embodiments of the present disclosure provide for the assignment of two or more cells to the same timing advance group when a UE has a substantially similar timing advance value with respect to each of the cells. The cells may be a macro cell and one or more small cells or may be a plurality of small cells. The determination of which cells are placed in the timing advance group may be made by a network node, and that information may then be transmitted to the UE, or such a determination may be made by the UE, and that information may then be transmitted to a plurality of network nodes.

The demand for wireless data is expected to increase due to the popularity of smart phones and other wireless devices. To meet this growing data demand, small cells may be deployed in areas where such demand exists. Due to the small footprint of small cells, the same frequency can be reused more often in a given area compared to macro cells, and thus more system capacity over a given area can be expected. This may be referred to as cell splitting gain.

Figure 1:
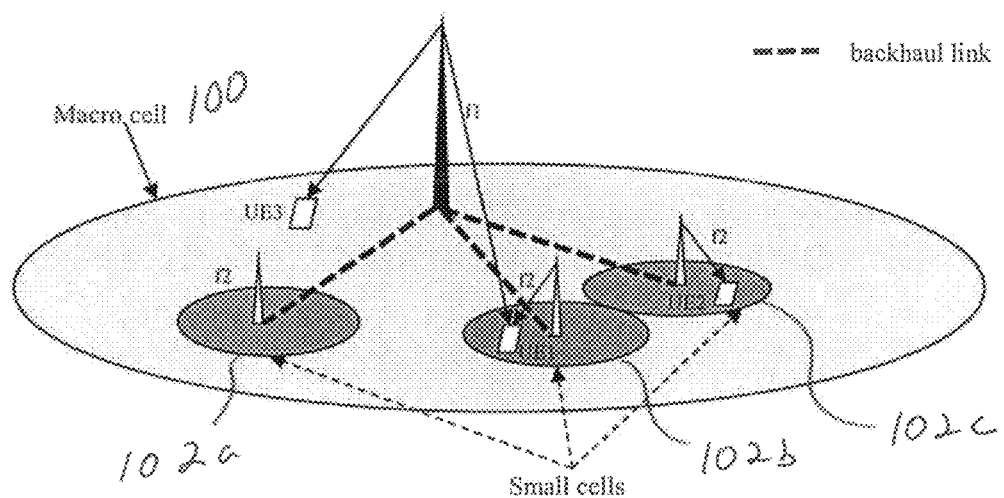
FIG. 1 is a diagram of small cells deployed within the coverage of a macro cell.

In one small cell deployment scenario, small cells are deployed in areas under the coverage of a macro cell. The small cells may operate at a different carrier frequency (typically at a higher frequency, e.g., 3.5 GHz) from the macro cell so that there is no interference between the macro cell and the small cells. An example is shown in FIG. 1, where three small cells are deployed within the coverage area of a macro cell 100. Two different carrier frequencies are deployed, carrier f1 for the macro cell and carrier f2 for the small cells 102a-c. UEs prior to LTE Rel-12 support a single radio link connection and can connect to either a macro cell or a small cell. In FIG. 1, UE2 and UE3 may be such UEs. UEs that are capable of multiple (i.e., two or more) radio link connections and that are under the coverage of both a macro cell and one or more small cells can receive data from and/or transmit data to both the macro cell and the small cells. In FIG. 1, UE1 may be such a UE.

A backhaul connection may exist between each small cell 102 and the macro cell 100 as shown in FIG. 1. The backhaul link may be both a logical connection and a physical connection. Physically, the backhaul connection may be a point-to-point link or may be routed through a network. Backhaul latency may be considered low when one-way latency is much less than one subframe, which is equal to 1 ms in LTE. Such a low latency may exist when a direct fiber link is used between the macro cell and a small cell. In such cases, centralized packet scheduling may be used for both the macro cell 100 and the small cell 102, and inter-site carrier aggregation (CA) as specified in LTE Rel-11 may also be used. The macro cell 100 may be the primary cell while the small cells 102 may be secondary cells. In the inter-site CA case, a UE is always connected to the primary cell, and all control plane information is carried over the macro cell. Mobility between small cells may be achieved by activation or de-activation of a small cell at a lower layer, such as the physical layer, or by applying a downlink coordinated multi-point (CoMP)-like operation among relevant cells. There may be no core network involvement.

However, a low-latency backhaul is not always possible in practice. In some scenarios, the latency of the backhaul link between the macro cell 100 and the small cells 102 may be as high as 60 ms. In such cases, centralized dynamic data scheduling for the macro cell 100 and the small cells 102 may no longer be practical due to factors such as the timing requirements for HARQ (hybrid automatic repeat request). Independent radio resource management and control, as well as packet scheduling, may be more appropriate in the small cells 102 in such cases.

Figure 2:
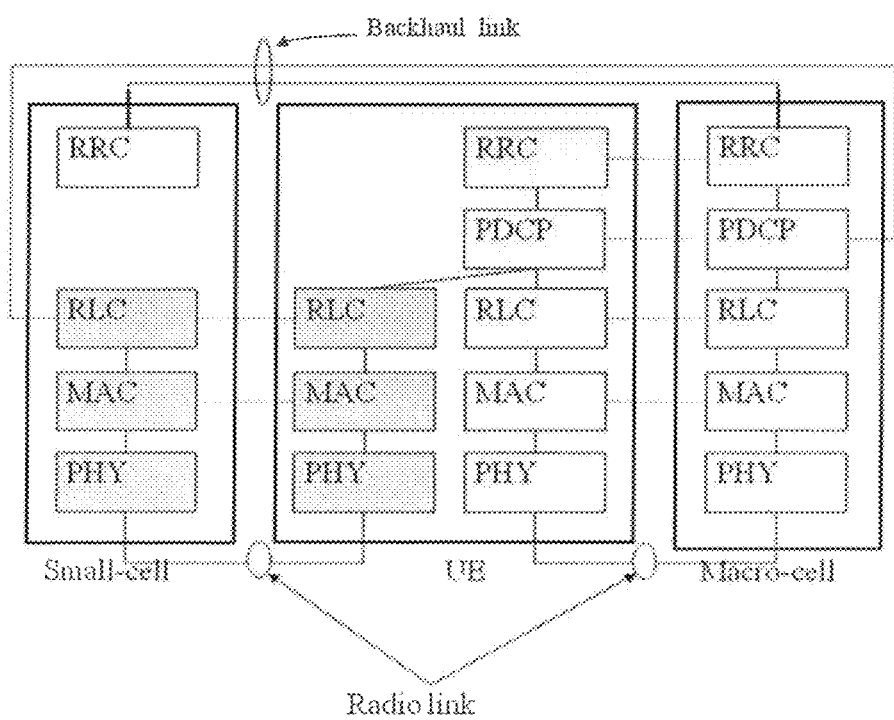
FIG. 2 is an example of a protocol stack for a dual-connectivity UE.

To avoid excessive signaling overhead in the core network as a result of normal handover between small cells 102, multiple connections may be supported by a UE. A difference in such multiple connections compared to LTE Rel-11 carrier aggregation is that, with such multiple connections, an independent medium access control (MAC) may be needed in the small cell 102 for packet scheduling. A UE capable of multiple connections may always be attached to the macro cell 100, assuming that macro coverage exists. If a UE that is connected only to a macro eNB or macro cell 100, such as UE3 in FIG. 1, moves under the coverage of a small cell 102, the macro cell 100 may offload some of the user plane traffic to the small cell. In this case, the UE would be connected to more than one cell. Because of the backhaul latency, an independent MAC may be needed for connecting to the small cell 102, in addition to a MAC for the macro cell 100 connection. This is illustrated in FIG. 2.

Note that Medium Access Control (MAC) is a sublayer of the layer 2 in the LTE system. The Service Access Points (SAP) between the physical layer and the MAC sublayer provides the transport channels. The SAPs between the MAC sublayer and the RLC sublayer provide the logical channels. The multiplexing of several logical channels (i.e. radio bearers) on the same transport channel (i.e. transport block) is performed by the MAC sublayer. When a first network node has a separate MAC scheduler from a second network node, the first network node is able to perform MAC functions such as those listed below separately from the second network node:

Mapping between logical channels and transport channels;

Multiplexing/demultiplexing of MAC service data units (SDUs) belonging to one or different logical channels into/from transport blocks (TB) delivered to/from the physical layer on transport channels;

scheduling information reporting;

Priority handling between logical channels of one UE;

Priority handling between UEs by means of dynamic scheduling;

Transport format selection;

Padding.

When there is no macro coverage and a UE capable of multiple connections is within the coverage of a small cell cluster, the UE may simultaneously connect to two or more small cell eNBs and again have two or more simultaneous wireless connections.

Several types of physical channels and signals are defined for uplink transmission from a UE to an eNB, including the Physical Uplink Shared Channel (PUSCH), the Physical Uplink Control Channel (PUCCH), the Physical Random Access Channel (PRACH), Sounding Reference Signals (SRS), and Channel State Information (CSI). The PUSCH is the main physical channel used for unicast transmission. The PUCCH is used by the UE to send HARQ acknowledgements, indicating to the eNB whether or not a downlink transport block was successfully received, to send channel status reports aiding downlink channel-dependent scheduling, and to request resources to transmit uplink data upon. The PUCCH may be periodic or aperiodic. The PRACH is used for random access. SRSs are transmitted on the uplink to allow the network to estimate the uplink channel quality at different frequencies. A UE may be configured to transmit an SRS at regular intervals, and the interval may be configurable. CSI may include a Channel Quality Indicator (CQI), a Precoding Matrix Index (PMI), and a Rank Indication (RI). The CQI provides information about the instantaneous channel quality at the UE. To assist the network in selecting a suitable precoding matrix for multiple input/multiple output (MIMO) transmission, a UE may report a recommended number of layers, expressed the RI, as well as a recommended PMI corresponding to that number of layers.

In certain mobile communication systems, such as LTE and Global System for Mobile Communications (GSM), orthogonality in the uplink may be either partly or fully achieved by separating the user transmissions in the time domain. In order to maintain such separation, a network node may need to receive the transmissions from various devices connected to a given network at substantially the time the transmissions would be expected if there were no propagation delay. In the case of LTE and GSM, such reception is ensured by means of a procedure known as the timing advance. In the radio resource control (RRC) connected mode in LTE, the eNB is responsible for maintaining the uplink timing through the timing advance procedure. The uplink timing of a UE is measured by the eNB using a PRACH and/or a periodic SRS signal transmitted by the UE. Periodic timing advance commands are transmitted by the eNB to maintain the uplink timing based on the received SRS signals. In the case of LTE, a UE knows when it is uplink synchronized and when it is not, based on a timer whose value is set by the network. While the time alignment timer is running, the LTE UE is considered to be in a synchronized state. The timer is restarted when a new timing advance command is received from the eNB. When a UE is not uplink synchronized, the UE is forced to release all synchronous uplink resources and initiates an uplink transfer only after a RACH procedure, upon which the uplink timing is re-attained.

Figure 3:
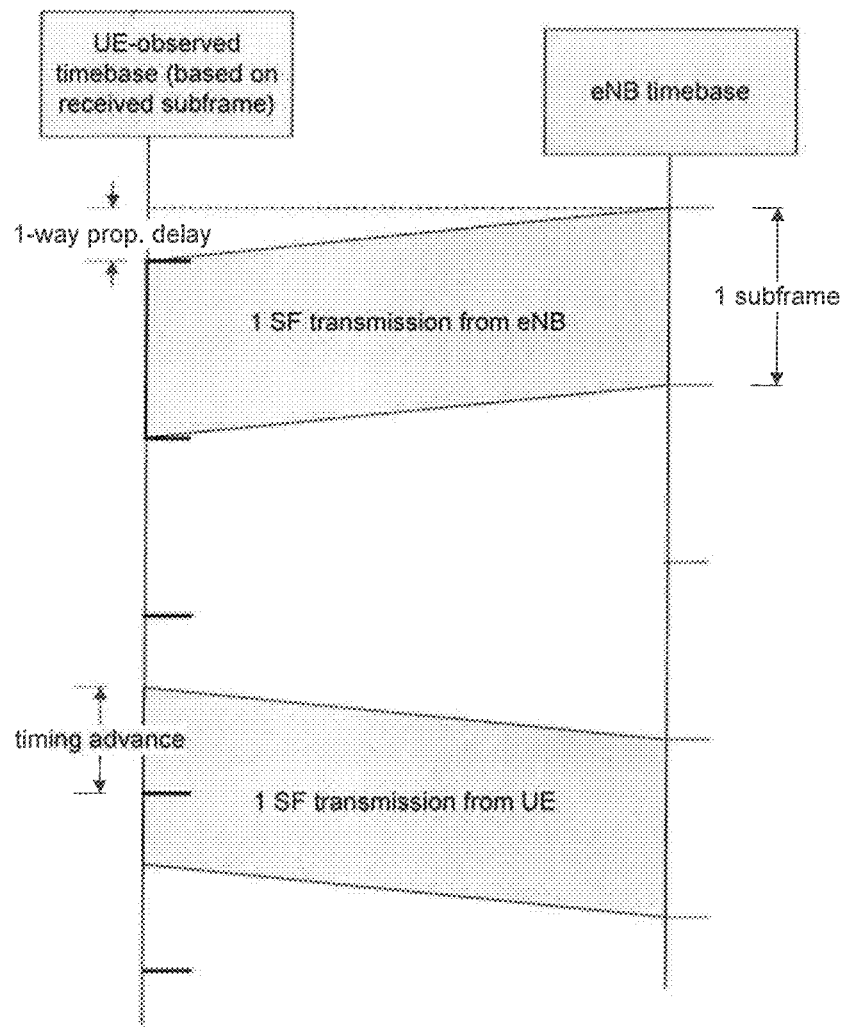
FIG. 3 is a diagram of a timing advance for uplink transmission from a UE to an eNB.

A timing advance procedure for an uplink transmission from a UE to an eNB is illustrated in FIG. 3. It can be seen that a timing advance causes the UE to transmit a subframe earlier than the UE would otherwise transmit the subframe. In this way, the subframe arrives at the eNB at substantially the time the subframe would be expected if there were no propagation delay between the UE and the eNB.

The timing advance for a UE is derived by an eNB from an uplink signal received from the UE. The timing advance is signaled by the eNB to the UE and used by the UE to adjust the timing of the UE's transmissions to the eNB so that the transmitted signals can reach the eNB at the desired time. A UE with the capability for multiple timing advances for carrier aggregation can simultaneously receive and/or transmit on multiple component carriers (CCs) corresponding to multiple serving cells with different timing advances. The multiple serving cells may be grouped into multiple timing advance groups (TAGs). E-UTRAN ensures that each TAG contains at least one serving cell.

It is possible to configure a UE to aggregate a different number of CCs originating from the same eNB. The number of TAGs that can be configured depends on the TAG capability of the UE.

In RRC_CONNECTED mode, the eNB is responsible for maintaining the timing advance. Serving cells having an uplink to which the same timing advance applies (typically corresponding to the serving cells hosted by the same transceiver) and using the same timing reference cell may be grouped in a TAG. Each TAG contains at least one serving cell with the configured uplink, and the mapping of each serving cell to a TAG is configured by RRC. The timing advance command for each TAG is transmitted on a per-need basis with a granularity in the step size of 0.52 µs.

Upon reception of a timing advance command for a TAG containing the primary cell, a UE adjusts the uplink transmission timing for the PUCCH, PUSCH, and SRS of the primary cell based on the received timing advance command. The uplink transmission timing for the PUSCH and the SRS of a secondary cell is the same as that for the primary cell if the secondary cell and the primary cell belong to the same TAG. Since the transmission timing is the same for all the synchronous uplink channels (PUCCH, PUSCH, and SRS) on a cell belonging to a given TAG, the network can rely on a single PRACH and/or SRS per TAG to maintain the uplink timing for all carriers belonging to that TAG.

Upon reception of a timing advance command for a TAG not containing the primary cell, the UE adjusts the uplink transmission timing for the PUSCH and the SRS of all the secondary cells in the TAG based on the received timing advance command, where the uplink transmission timing for the PUSCH and the SRS is the same for all the secondary cells in the TAG.

Due to the non-ideal backhaul between network nodes, the delay between two eNBs may be as much as 60 ms. Such a long delay is excessive compared to the 1 ms duration of an LTE subframe and may make it impossible to have a single scheduler controlling two eNBs, if scheduling decisions are made on a per-subframe basis. Currently, user plane architecture assumes that MAC scheduling and baseband processing are independent between the macro eNB and the small cells, even though the macro eNB and the small cells may jointly serve a UE with dual connectivity. If the macro cell eNB and the small cell eNB each has an independent MAC, then timing advance information of one cell is not immediately known to the other cell. Thus, timing advance grouping cannot necessarily be maintained by a single central controller.

Due to the possible large distance difference between the macro cell connection and the small cell connection and the difficulty in synchronizing non-collocated eNBs separated by a non-ideal backhaul, misaligned subframe boundaries may exist in small cell deployments. In a small cell scenario where multiple connections may exist between a UE and multiple eNBs that are separated by non-ideal backhaul, it is not clear how a TAG may be constructed and signaled to the UEs. Procedures may be needed for the network to configure a UE to aggregate a number of CCs originating from different eNBs, such as a macro eNB and multiple small cell eNBs. On the UE side, consideration may need to be given to the level of support the UE can provide, taking into account the TAG capabilities of the UE. This may be contrasted with systems where the multiple cells in all the TAGs of a UE belong to the same eNB. For example, the multiple cells may be due to remote radio heads (RRHs) that are all controlled by the same eNB with an ideal backhaul link.

In cases where there is no central controller, grouping cells with a similar timing advance into a TAG may not be possible. If cells with a similar timing advance cannot be grouped into a TAG, the UE may need to transmit a RACH towards every cell to which the UE is connected to attain the timing advance value, rather than transmitting a RACH to only one cell in a TAG.

A UE may reduce the output power per carrier for the overlapping regions of a subframe when two different timing advances are used for each carrier. This may impact the quality of reception of the overlapping regions on the network side. Unlike in the case of carrier aggregation, in a small cell scenario, the network may not be aware of the overlapping region, as the network may not be aware of the timing advance on each TAG. Hence, the network may not be able to take this knowledge into account in its link performance measurement decisions. Thus, a suboptimal link quality estimation may occur on the network side. Further, the UE may need to drop an SRS transmission to a first carrier if the SRS transmission to the first carrier and the PUCCH and PUSCH to a second carrier are scheduled on overlapping subframes. In the carrier aggregation scenario, the eNB will be aware of the lack of an SRS. However, in case of a small cell scenario, the eNB may assume that the SRS was transmitted but is missing. This assumption may result in the eNB unnecessarily ordering a higher power for the next SRS transmission. Additionally or alternatively, the eNB may drop the call altogether due to estimating a suboptimal link quality.

In carrier aggregation, a TAG may be applied to serving cells having a similar range of timing advance, and the TAG configuration for a serving cell of a UE may be signaled from the eNB to the UE through RRC signaling. In RRC_CONNECTED mode, the eNB is responsible for maintaining the timing advance. Serving cells having an uplink to which the same timing advance applies (typically corresponding to the serving cells hosted by the same transceiver) and using the same timing reference cell may be grouped in a TAG.

A similar solution may not be applicable for the small cell scenario because of the lack of a central node with knowledge of all timing advance values seen by a UE. Hence, modifications may be required for cases where a UE is served by both a macro cell and one or more small cells. A key difference between the existing TAGs in a carrier aggregation scenario and potential TAGs for a small cell scenario is that a small cell has its own radio resource management (RRM) for the small cell radio link, and the combination of a macro cell and a small cell may not be under control of a single eNB and thus may not be configured by a single RRM entity.

Embodiments of the present disclosure provide techniques for managing the different timing advances that a UE may have to simultaneously support when the UE has connections to a macro eNB and one or more small cell eNBs or to two or more small cell eNBs. In an embodiment, two or more cells to which a dual-connectivity UE connects may be grouped into a timing advance group based on the timing advance seen by the UE in each cell. That is, cells with the same or a similar timing advance value may be grouped together into a timing advance group. Cells may be considered to have a similar timing advance value when the difference in the timing advances in the cell is below a threshold. The signaling overhead involved in updating and/or maintaining such grouping may not be excessive for at least two reasons. First, for small cells, UEs will be generally static. Fast-moving UEs are typically discouraged from being handed over to a small cell due to the small coverage of small cells. Second, even if a UE is relatively mobile, the connected cells themselves may change using a mobility procedure, such as adding a cell or deleting a cell. The signaling overhead resulting purely from a change in a timing advance group is expected to be minor in comparison.

A TAG used in a small cell scenario may be referred to as a TAGSCE to indicate a small cell enhancement. A TAGSCE may be defined as a timing advance group consisting of carriers of cells of one or more eNBs with a similar timing advance value. The decision of assigning a cell to a TAGSCE may be made at a network node, such as a macro eNB or a small cell eNB, or at a UE. If the decision to group the cells into a TAGSCE is performed at a network node, some additional information may be needed from the UE to aid the decision process on the network side. On the other hand, if a UE decides on the grouping of cells into a TAGSCE, then the UE may need to provide the resulting grouping to the network nodes to which the UE is connected.

In the case of network-based grouping, the decision to assign a cell to a TAGSCE is made at a network node, such as a macro eNB (MeNB) or a small cell eNB (SeNB), although assistance may be provided by a UE, such as providing a timing advance grouping as observed by the UE. The assignment may then be signaled from the MeNB or SeNB to the UE. The coordination between network nodes in forming a TAGSCE may occur via backhaul signaling, for example. TAGSCE construction may be performed either with or without macro coverage. Modifications may be made to RRC signaling to indicate to the UE the TAGSCE association of each cell.

In an alternative embodiment, the decision regarding assigning a cell to a TAGSCE is made at a UE. The assignment may then be signaled from the UE to the eNBs to which the UE is connected. The eNBs may use this information to perform various actions, such as reconfiguring the UE with a common SRS configuration for all the cells belonging to a given TAGSCE.

When a UE is configured to connect to a MeNB and one or more SeNBs simultaneously, the timing advance on each connection is likely to be different even if the macro cell and the small cells are synchronized. The uplink subframes to the MeNB and the uplink subframes to a SeNB may not have their subframe boundaries aligned from the UE's perspective due to the different distances from the MeNB and the SeNB to the UE. On the other hand, for small cells located closely in a cluster, the timing advance is likely to be the same or similar if the small cells are synchronized. Thus, in addition to the actual timing advance seen by the UE, grouping of cells into TAGs may be based on a number of other factors such as whether or not the eNBs are collocated and whether or not the eNBs are synchronized. This is different from the carrier aggregation scenario where all cells to which a UE connects belong to the same eNB and are synchronized.

Figure 4:
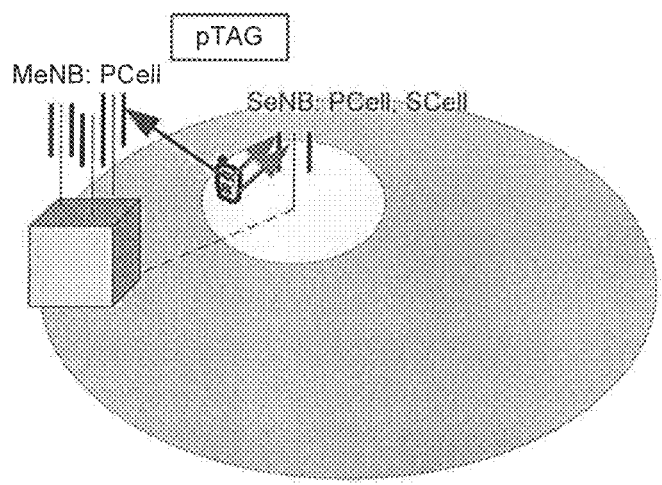
FIG. 4 is a diagram of a PCell and an SCell of an SeNB belonging to the same timing advance group as the PCell of an MeNB, according to an embodiment of the disclosure.

Several timing advance grouping examples are illustrated in the embodiments of FIGS. 4-7. For simplicity in the examples, only the eNB location is used to illustrate the timing advance grouping. FIG. 4 illustrates a scenario where there is macro coverage and where the component carriers of a small cell belong to the same TAGSCE as the primary cell (PCell) of the MeNB. That is, the SeNB and the MeNB are close enough to one another that the SeNB and the MeNB can be placed in the same TAGSCE. In FIG. 4, pTAG is the primary TAG, which contains the PCell of the MeNB and the PCell and secondary cell (SCell) of the SeNB.

Figure 5:
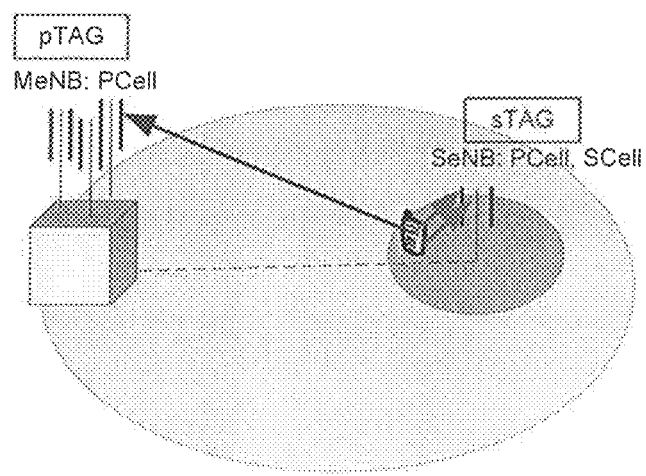
FIG. 5 is a diagram of a PCell and an SCell of an SeNB belonging to a different timing advance group from the PCell of an MeNB, according to an embodiment of the disclosure.

FIG. 5 illustrates a scenario where there is macro coverage and where the component carriers of a small cell belong to a different TAG than the PCell of MeNB. That is, the SeNB and the MeNB are so far from one another that the SeNB and the MeNB are placed in different TAGSCE. In FIG. 5, pTAG is the primary TAG, which contains the PCell of the MeNB, and sTAG is the secondary TAG, which contains the PCell and SCell of the SeNB.

Figure 6:
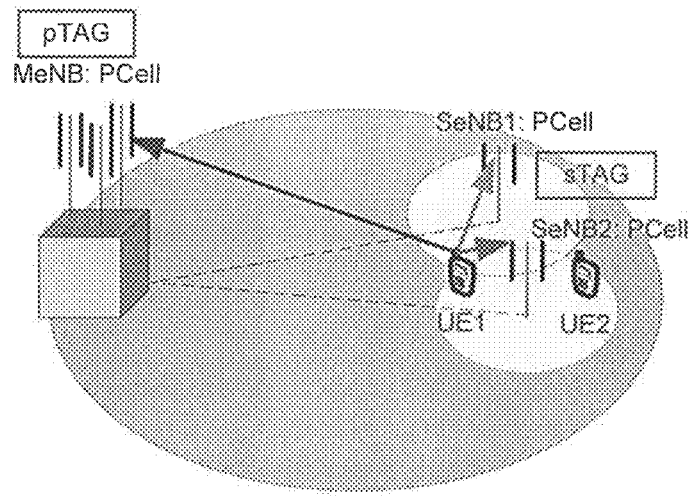
FIG. 6 is a diagram of PCells of two neighboring SeNBs belonging to the same timing advance group in a case where there is macro coverage, according to an embodiment of the disclosure.

FIG. 6 illustrates a scenario where there is macro coverage and where the component carriers of two neighboring small cells belong to the same TAGSCE, which is different from the TAGSCE that the PCell of the MeNB belongs to. In FIG. 6, pTAG is the primary TAG, which contains the PCell of the MeNB, and sTAG is the secondary TAG, which contains the PCell of SeNB1 and the PCell of SeNB2.

Figure 7:
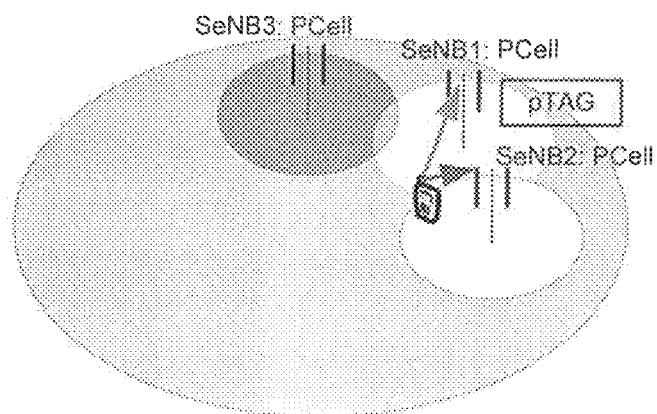
FIG. 7 is a diagram of PCells of two neighboring SeNBs belonging to the same timing advance group in a case where there is no macro coverage, according to an embodiment of the disclosure.

FIG. 7 illustrates a scenario where there is no macro coverage and where the component carriers of two neighboring small cells in a small cell cluster belong to the same TAGSCE. In FIG. 7, pTAG is the primary TAG, which contains the PCell of SeNB1 and the PCell of SeNB2.

Other combinations are possible, such as a case where two neighboring small cells are located at the MeNB, and the MeNB and the small cells belong to the same TAGSCE. Also various component carrier combinations at the MeNB and SeNB are also possible, all of which will readily suggest themselves to one skilled in the art based on the present disclosure.

In order to support the wide variety of scenarios a UE may experience, a TAGSCE association may need to be given for each component carrier (CC) that the UE has a connection with, where the CC may belong to a MeNB or a SeNB. To simplify the following discussion, it may be assumed that the transceivers of a given eNB are located with the base station. That is, an eNB may not use remote radio heads (RRHs) for inter-site carrier aggregation deployment. Thus, one timing advance value may be shared by all CCs of an eNB, and the timing advance of a CC may sometimes be referred to as the timing advance of the eNB in the following. When inter-site carrier aggregation deployment of an eNB is considered, similar mechanisms can be applied, with the difference that CCs of an eNB may have different timing advance values.

The grouping of the CCs of the macro eNB and the small cells into TAGs may be performed either by the eNB or by the UE. In the following, the term "TAGSCE" is used to refer to a timing advance group in a small cell scenario, to differentiate such a timing advance group from the TAG of carrier aggregation. Herein, "TAGSCE" may refer to an inter-eNB serving cell assignment, while "TAG" may refer to an assignment of serving cells that belong to a single eNB. This distinction may be only for discussion purposes. In actual implementation, this distinction may not be necessary in that all types of serving cells that a UE connects to may be grouped and signaled in the same manner.

Figures 8, 9:
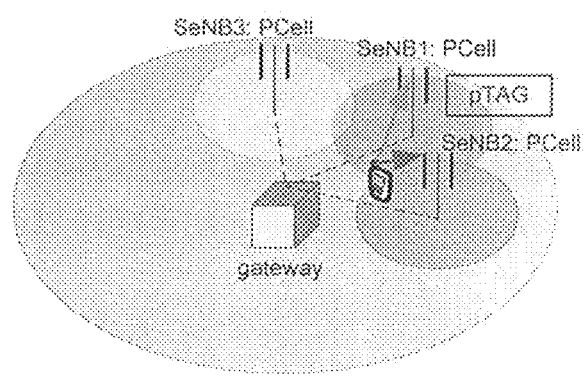
FIG. 8 illustrates modifications that may be made to 3GPP Technical Specification 36.331, according to an embodiment of the disclosure.
FIG. 9 is a diagram of a gateway providing coordination between SeNBs in a cluster without macro coverage, according to an embodiment of the disclosure.

A UE with dual connectivity may have connections to two eNBs, such as a MeNB and a SeNB or two SeNBs. For such a UE, at most two TAGSCE, one primary and one secondary, may need to be defined. For a UE with connections to three or more eNBs, more than two TAGSCE are possible. Also, more than two TAGSCE are possible if an eNB utilizes RRHs to deploy a physical cell. For simplicity, the maximum number of secondary TAGSCE can be limited to three, which complies with the LTE Rel-11 carrier aggregation requirement, and thus does not increase the UE's implementation complexity. For standard specification purposes, the maximum number of TAGSCE may be expected to be an RRC parameter, predefined for a given release. For example, in an embodiment, a new field may be added to "Multiplicity and type constraint definitions" under "6.4 RRC multiplicity and type constraint values" of 3GPP Technical Specification (TS) 36.331, as shown in FIG. 8. Text that may be added to the standard is underlined.

For a small cell scenario, a MeNB and a SeNB may be visible to a UE, and each of the MeNB and SeNB may further have multiple component carriers. When the UE receives a timing advance command for a TAGSCE containing the PCell of the MeNB, the UE may adjust uplink transmission timing for the PUCCH, PUSCH, and SRS of the PCell of the MeNB based on the received timing advance command. The uplink transmission timing for the PUCCH, PUSCH, and SRS of the SCell of the MeNB, PCell of the SeNB, and SCell of the SeNB may be the same as that of the PCell of the MeNB if all of these cells have the same TAGSCE.

When a UE receives a timing advance command for a TAGSCE not containing the PCell of MeNB, the UE may adjust the uplink transmission timing for the PUCCH, PUSCH, and SRS of all the secondary cells of the MeNB, the PCell of the SeNB, and the SCell of the SeNB in the TAGSCE based on the received timing advance command, where the uplink transmission timing for the PUCCH, PUSCH, and SRS is the same for all the component cells in the TAGSCE.

Thus, a benefit of grouping the cells into a TAGSCE based on the timing advance values of the cells is that one SRS/RACH and other timing advance-related procedures may be used for all the component carriers belonging to a TAG. The signaling and processing overhead may thereby be reduced compared to what would otherwise be needed. It may be noted, however, that the TAGSCE may be formed either at the UE or at the network, and the network may need to know the grouping. The network may also need further information about the timing of the individual cells to deduce the overlapping regions of subframes between carriers.

Embodiments where the grouping of cells into TAGSCE is done by a network node will now be considered in more detail. In these embodiments, the decision of assigning a cell to a TAGSCE is made at a network node, such as a MeNB or a SeNB, although assistance may be provided by a UE. The assignment is then signaled from the MeNB or SeNB to the UE. The TAGSCE may be formed via coordination between network nodes, such as between a MeNB and a SeNB or between two SeNBs, over the Xn interface, where the Xn interface refers to the backhaul interface between the MeNB and the SeNB or between SeNBs.

In an embodiment, the cell grouping of TAGSCE may be a function of the layout of the network nodes. For instance, it may be known to the network that a UE connected to a small cell has the same or a substantially similar timing advance as a plurality of other small cells due to the location and coverage area of the small cells. Further, the network nodes may also exchange information related to the actual timing advance for each UE and/or to the timing of the cell's downlink to further deduce the overlapping parts of the subframes. In order to achieve this exchange of information, the eNBs may store cell layout information, such as neighbor cell relationship and cell coverage, and deduce the cell grouping for the TAGSCE. The eNB may apply the same TAGSCE cell assignment to all UEs that have the same set of connections.

TAGSCE construction may be performed either with or without macro coverage. When there is macro coverage, the MeNB may provide control plane connectivity to the UE. In this case, the MeNB may act as the central controller and collect all information relevant to forming the timing advance groups. This information may include items such as a UE's current connections to various cells, the downlink timing of these cells, whether or not the cells are synchronized, the actual timing advance seen by the UE for each of these cells, and further information such as the uplink control channel configuration (e.g., SRS configuration).

Based on this information, the MeNB may assign cells to an appropriate TAGSCE. Subsequently, the MeNB may signal the grouping of the cells into TAGSCE to the UE using RRC signaling. The MeNB may update the grouping and signal the update to the UE upon any cell changes at the UE.

The information necessary for the MeNB to construct the TAGSCE may be solicited from the small cells themselves or from the UE. Further, the MeNB may also be aware of the cell layout, and this information may be used in the decision making process of grouping the cells into a given TAGSCE. For example, small cells that are close together and have very small coverage areas may be grouped in the same TAGSCE. The MeNB and the SeNB may exchange timing advance information about the UE and decide if the MeNB and the SeNB should belong to the same TAGSCE or different TAGSCE. For example, the SeNB may report the UE's timing advance to the MeNB via the Xn interface. This information may also be reported directly by the UE to the MeNB on the air interface. Based on this information, the macro eNB may then determine the grouping of cells into TAGSCE. The SeNB or the UE may report the UE's timing advance to the MeNB when the timing advance value is initialized and when the timing advance value is updated. In addition to the timing advance value, the MeNB may also need to obtain the actual downlink timing of the individual cells. The MeNB may obtain this information by storing subframe/radio frame timing offset information between the macro cell and small cells in the vicinity of the MeNB, where the timing offset information may be obtained between two eNBs over the Xn interface. Alternatively, the timing offset information may be provided by a UE using a Self Organizing Network (SON) procedure. Further, based on the timing offset value and the actual timing advance associated with the cell as seen by the UE, the MeNB may deduce which subframes may overlap.

When a UE is first offloaded to a small cell, the grouping of cells according to the timing advance may not be available. By default, the MeNB may assign component carriers of different SeNBs to a different TAG. This scenario is similar to the example illustrated in FIG. 5, where the UE maintains two TAGSCE. This procedure may apply when the MeNB has little or no knowledge about the serving cells the UE is connected to. On the other hand, if the MeNB has some knowledge about the serving cells the UE is connected to, then another default assignment may be used by the MeNB. For example, the MeNB may assign the component carriers of different SeNBs to the same TAGSCE.

When the latest timing advance information between a UE and one or more SeNBs becomes available to the MeNB, the MeNB may reassign the TAGSCE of the component carriers of a SeNB. For the example illustrated in FIG. 6, if the timing advance of SeNB1 is the same as the timing advance of SeNB2, then component carriers of SeNB1 and SeNB2 may be reassigned to the same TAG (sTAG in FIG. 6). Thus, instead of maintaining three timing advance values, only two timing advances are maintained by the UE.

Furthermore, the construction of a TAGSCE may be done in a self-configurable manner. This method of TAGSCE construction may reduce the coordination overhead between the MeNB and the SeNB. For example, the MeNB may keep a neighbor cell list of each affiliated small cell. If the MeNB has location information for the SeNBs, grouping of neighbor SeNBs into one TAGSCE may be performed by the MeNB based on the proximity of the SeNBs. For TAGSCE construction purposes, two SeNBs that are neighbor cells may be assumed to belong to the same TAGSCE. This assumption may be derived from the fact that small cells have a small footprint. In this case, the TAG allocation for a component carrier belonging to the MeNB or the SeNB is independent of the UE, and only the association of a SeNB into the same TAGSCE is signaled to a UE. In addition, the MeNB may keep a record of component carriers of SeNBs that have been determined to belong to the same TAGSCE for a given UE. For future UEs or a returning UE, the MeNB may assume that the same TAGSCE configuration holds. This scenario is illustrated in FIG. 6. After the TAGSCE assignment of the MeNB, SeNB1, and SeNB2 is determined for UE1, the MeNB may apply the same timing advance grouping to UE2 when establishing the connection between UE2 and one or both of SeNB1 and SeNB2. Furthermore, the timing advance step size of 0.52 µs corresponds to a distance of 0.52 µs×(3×108) m/s=152 m. Considering that cell radius of a small cell is expected to be small, the timing advance value of UE1 may be reused when a measurement report from UE2 to the MeNB indicates that UE2 is capable of establishing one or more secondary connections with one or both of SeNB1 and SeNB2.

For the scenario illustrated in FIG. 6, the fact that two eNBs belong to the same TAGSCE for a given UE may be utilized to improve transmission and reception performance. For example, the eNBs may cooperate in a joint transmission or joint reception. For a downlink transmission, two eNBs in the same TAGSCE may act as distributed antennas. The eNBs may transmit the same data packet to the UE to improve the downlink signal to interference plus noise ratio (SINR). Alternatively, the eNBs may transmit different data packets to the UE to improve the downlink data rate. For an uplink transmission, reception of the eNBs may be combined to improve the uplink SINR.

TAGSCE construction without macro coverage will now be considered. When there is no macro coverage, the TAGSCE construction may need to be coordinated between SeNBs, if the UE maintains a dual connection with two SeNBs.

If a cluster topology allows the SeNBs to interconnect directly in a fully connected or partially connected topology, then in an embodiment, neighbor SeNBs may coordinate with one another directly. The coordination may be done in a manner similar to the scenario with macro coverage, where the role played by the MeNB (i.e., assigning cells to the TAGSCE and signaling the assignment to UE) is taken by the SeNB that is designated to be the primary cell to the UE. Here the primary cell is a cell that provides control plane signaling towards the core network for the UE.

If the cluster has a star topology, then in an embodiment, a logical entity, such as a gateway, a mobility management entity (MME), or any network node that is connected to all the SeNBs, may be defined as a central controller for the SeNBs in the cluster. Each SeNB may connect to the gateway or other logical entity directly. Hereinafter, any such central node with a logical connection to the SeNBs may be referred to as a gateway. The gateway may provide a coordination function between SeNBs, including the assignment of cells to a TAGSCE. Signaling of the assignment to a UE may be performed by the SeNB that is designated to be the primary cell to the UE, since the gateway does not have a direct physical link to the UE. This scenario is illustrated in FIG. 9. In this case, all the information necessary to group cells into TAGSCE may be acquired via the SeNBs.

Once the cells are grouped into TAGSCE, the associations between the cells and the TAGSCE may need to be signaled back to the UE. While the following description assumes that the MeNB sends the RRC signaling to the UE, similar messages may be defined for the scenarios where the RRC signal is sent by a SeNB.

In an embodiment, the MeNB signals to the UE the secondary TAGSCE associated with the SeNBs that the UE is offloaded to. The RadioResourceConfigDedicated message may be used to carry the TAGSCE information associated with a SeNB. Each SeNB may signal to each UE which TAGSCE the SeNB belongs to.

An example of possible changes that may be made to the 3GPP TS 36.331 specification in order to implement such concepts is shown in FIG. 10. Changes to the specification are underlined. For a macro cell, new fields may need to be added the MAC-MainConfig to signal to the UE the TAGSCE configuration of associated small cells. For a SeNB, the MAC-MainConfig provides the TAGSCE that the small cell belongs to. Related modifications to the text of 3GPP TS 36.331 Section 5.3.10.4 (MAC main reconfiguration) are also shown in FIG. 10.

Scenarios where a TAGSCE is sent from a UE to a network node will now be considered. In these embodiments, the decision of assigning a cell to a TAGSCE is made at the UE. The assignment is then signaled from the UE to the eNBs. In such cases, it may initially be assumed that the UE maintains a separate timing advance with each eNB. A timing advance command on cells of one eNB may have no effect on the timing advances of cells of another eNB. The cell grouping of a TAGSCE may be UE-specific and UE-location specific. While possible, it is not expected that a TAGSCE provided by a UE will be used by the network towards another UE.

A UE may be aware of the timing advance values for each cell. Based on these values, the UE may group cells with a similar timing advance value into a given TAGSCE. Assigning cells to a TAGSCE allows the UE to take different transmitting actions based on whether or not two uplink connections belong to cells in the same TAGSCE. The UE may then need to inform one or more eNBs about the association between the cells and the TAGSCE in order to ensure that the receivers at the eNBs know how to process the UE's transmissions. The network nodes may then assign a single SRS/RACH or other timing update-related procedures for all the cells belonging to the same TAGSCE and thus may save on signaling. The network may also need knowledge of the actual timing of the downlink of each cell, as noted above. This information may also be provided to the network by the UE, for instance as a relative offset in the downlink timing observed by the UE for each cell. Subsequently, the UE may apply different power control mechanisms, may or may not drop SRS signaling, and may or may not shorten the PUCCH depending on the overlapping subframes on each cell, and the network will be aware of which of these actions the UE is likely to take.

For instance, if two eNBs are within the same TAGSCE, the UE may drop SRS transmission to a first eNB if there is a collision with a PUCCH sent to a second eNB in the same subframe. The first eNB may predict and/or detect the SRS drop and discard the corresponding channel estimation in that subframe if the first eNB knows that the first eNB is within the same TAGSCE as the second eNB and also knows the UE PUCCH configuration in the second eNB.

Figure 11:
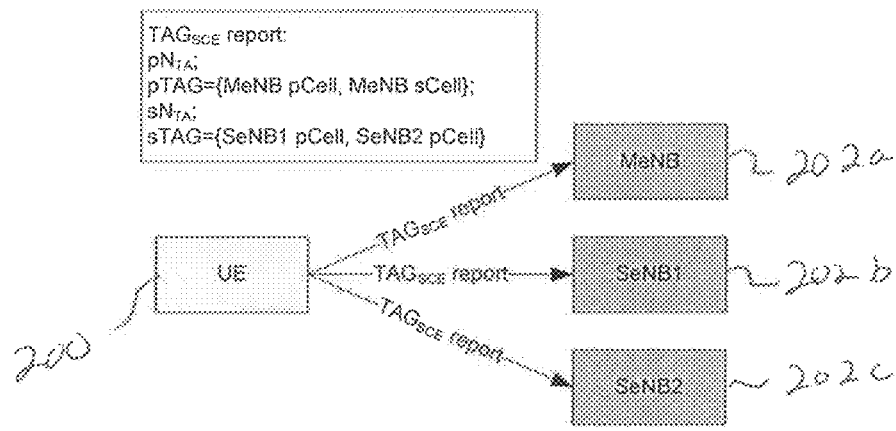
FIG. 11 is a diagram of a timing advance group report from a UE to connected eNBs, according to an embodiment of the disclosure.

FIG. 11 illustrates a UE 200 informing all affected eNBs 202 about the TAGSCE that the UE has constructed. This signaling assumes the deployment scenario of FIG. 6. In addition to the assignment of cells to a TAGSCE, the UE 200 may also signal the uplink time alignment (NTA) of each TAGSCE, where an NTA value is represented by 11 bits. These time alignments are illustrated as pNTA (for primary TAGSCE) and sNTA (for secondary TAGSCE) in FIG. 11.

On the other hand, for certain scenarios, the overhead may not justify signaling the timing, and only the cell composition of a TAGSCE may be sufficient. For example, for a synchronized network, the timing advance difference between cells is limited to the duration of one orthogonal frequency division multiplexing (OFDM) symbol. A network node may use this information in its receiver without knowing the actual timing advance values.

The subframe overlap between an uplink transmission to a MeNB and an uplink transmission to a SeNB is a function of the subframe time offset between the MeNB and the SeNB. The network may need to be aware of the overlap between uplink subframes, as this overlap may impact the UE power on each cell and may dictate when the UE may drop certain signals. For example, the UE may refrain from transmitting SRS on some overlapping subframes. The following discussion will consider how the network may be able to deduce the overlapping region of the subframes based on the information the network receives during the process of assigning cells to a TAGSCE.

Figure 12:
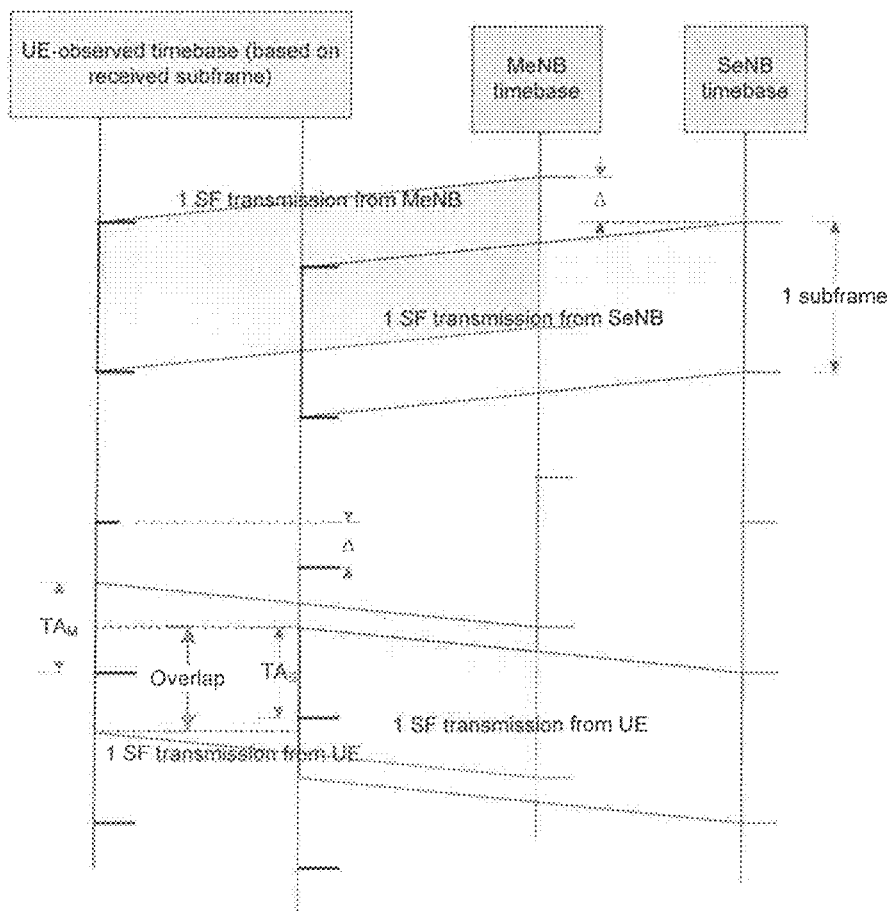
FIG. 12 is a diagram of an uplink transmission timing relationship between an MeNB and an SeNB, according to an embodiment of the disclosure.

Let Tsubframe be the duration of a subframe, let Δ be difference between the starting time of subframe i of a MeNB and the starting time of subframe i of a SeNB, let TAM be the timing advance towards the MeNB, and let TAS be the timing advance towards the SeNB, as illustrated in FIG. 12. Then the amount of overlap between the two uplink transmissions is:

$$\text{Overlap} = T_{subframe} - \Delta + TA_S - TA_M.$$

In 3GPP LTE, $T_{subframe} = 1$ ms.

The uplink transmissions have an offset of (Δ+TAM−TAS). For subframe i of the MeNB, the overlap starts at Δ−TAS+TAM, relative to the start of subframe i. For subframe i of the SeNB, the overlap starts at the beginning of subframe i.

Thus, for unsynchronized networks, the uplink transmission overlap is a function of the subframe timing offset Δ of the eNBs. This offset may need to be taken into account in TAGSCE-related procedures. Since the offset Δ is a fixed value that is not UE-specific, it may be relatively straightforward to measure and account for Δ. The MeNB and the SeNB may exchange synchronization information over the Xn interface so that both the MeNB and the SeNB know the value of Δ. This Δ value may be considered a system parameter and may be used for all UEs under coverage.

In the case where the TAGSCE is transmitted from the network to a UE, the MeNB and the SeNB may measure TAM and TAS, respectively, for each UE. The SeNB may signal the timing advance value, TAS, to the MeNB. The MeNB may then use (Δ+TAM−TAS) to determine the TAGSCE assignment of the SeNB.

In the case where the TAGSCE is transmitted from a UE to the network, the UE may receive TAM and TAS from the MeNB and the SeNB, respectively. The UE may then send the TAM value to the SeNB and send the TAS value to the MeNB. Thus, the MeNB and the SeNB may each derive the overlap region in their uplink subframes.

As mentioned above, when a UE is configured with multiple TAGSCE, the UE may need to adjust uplink transmissions in the overlapping portion of the subframes. The adjustment may be contingent on the transmission timing of the PUCCH, PUSCH, SRS, and RACH. It may be preferable for one eNB to be fully aware of the PUCCH, PUSCH, SRS, and RACH transmissions of another eNB, so that the eNBs can interpret the uplink transmission adjustment performed by the UE without ambiguity.

However, due to the relatively independent MAC operation of the network nodes, such as the MeNB and the SeNBs, the PUCCH, PUSCH, SRS, and RACH scheduling of one eNB may not be known to another eNB. Also, it may be impractical to require fully sharing the uplink scheduling information of one eNB with another eNB. As a compromise, certain slow-varying scheduling information may be shared between eNBs of different TAGSCE, so that one eNB may become aware of the uplink scheduling of another eNB with reduced signaling burden.

One example involves SRS scheduling. The parameter srs-SubframeConfig is provided by higher layers and is slow-varying. To share SRS transmission timing with limited overhead, eNBs of different TAGSCE may signal the srs-SubframeConfig parameter to each other via the Xn interface. With srs-SubframeConfig, the cell-specific subframe configuration period, $T_{SFC}$ and the cell-specific subframe offset, $\Delta_{SFC}$, for the transmission of sounding reference signals can be derived.

Another example involves periodic PUCCH transmission for CSI reporting. The periodicity, $N_{pd}$, (in subframes) and offset, $N_{OFFSET,CQI}$, (in subframes) for CQI/PMI reporting are determined based on the parameter cqi-pmi-ConfigIndex ($I_{CQI/PMI}$). The periodicity, $M_{RI}$, and relative offset, $N_{OFFSET,RI}$, for RI reporting are determined based on the parameter ri-ConfigIndex ($I_{RI}$). Both cqi-pmi-ConfigIndex and ri-ConfigIndex are configured by higher layer signaling. The parameters cqi-pmi-ConfigIndex and ri-ConfigIndex may be shared between eNBs so that the subframe indices of periodic PUCCH transmissions of one eNB are known to another eNB.

The embodiments disclosed herein provide techniques for grouping cells according to the timing advance values of the cells, for signaling the grouping between an eNB and a UE, and for providing additional information, such as the relative timing of the eNB's downlink transmissions, to the network. Such information may provide means to reduce the signaling overhead by enabling the eNB to assign a single SRS/RACH and other timing advance update-related procedures to all the cells belonging to a given TAGSCE. Further, when the above information is available to one or more eNBs, the eNBs may take necessary measures when receiving the uplink signals from a UE.

Figure 13:
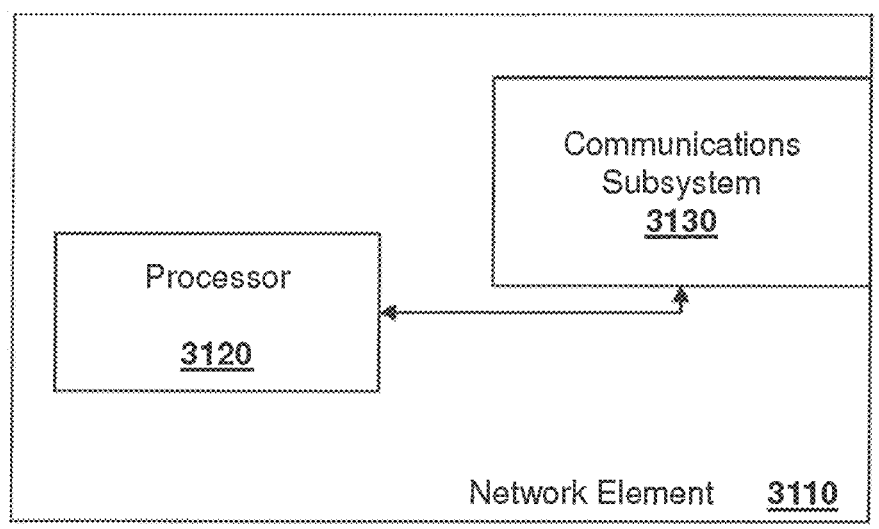
FIG. 13 is a simplified block diagram of an exemplary network element according to one embodiment.

The above may be implemented by a network element. A simplified network element is shown with regard to FIG. 13. In FIG. 13, network element 3110 includes a processor 3120 and a communications subsystem 3130, where the processor 3120 and communications subsystem 3130 cooperate to perform the methods described above.

Figure 14:
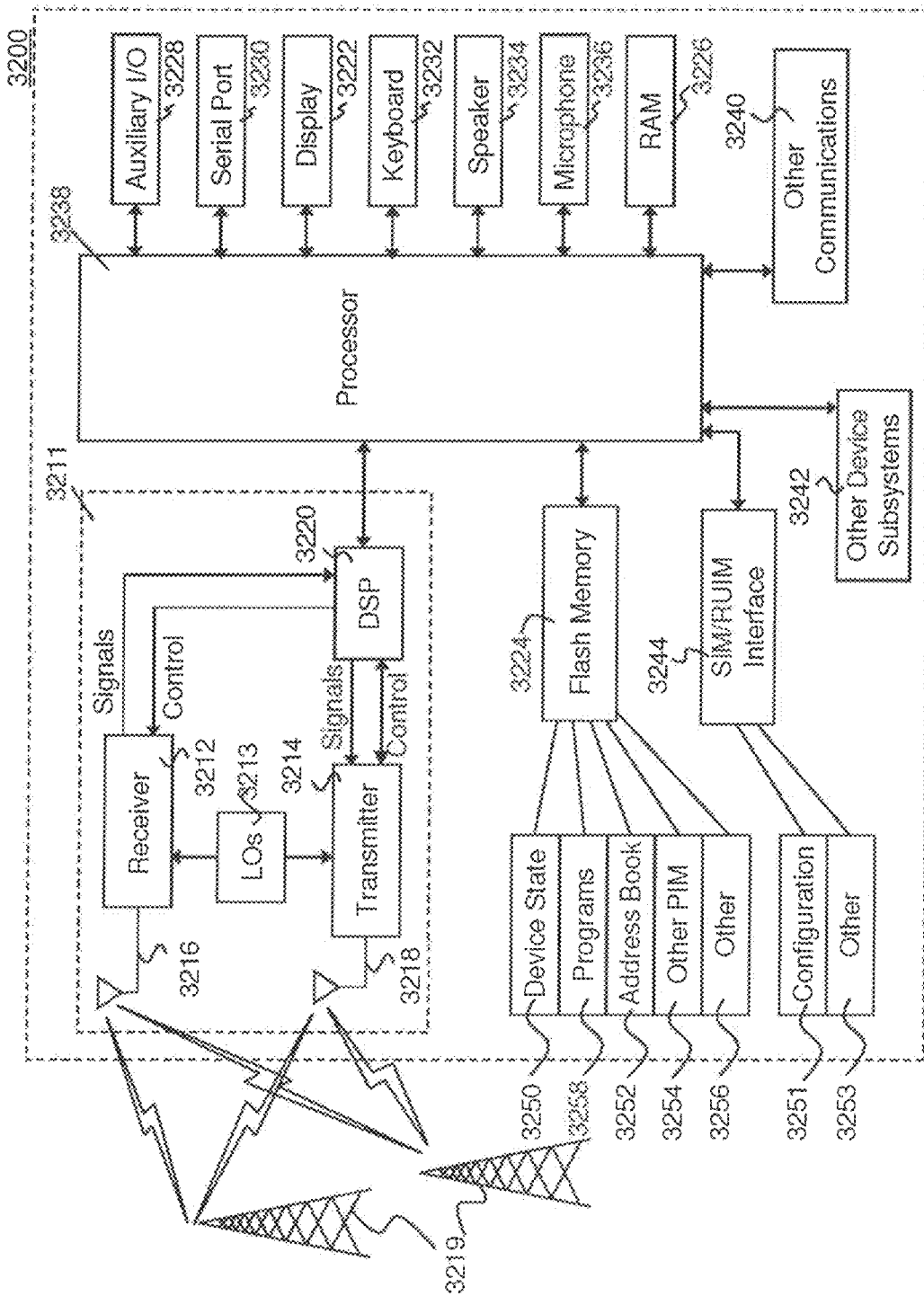
FIG. 14 is a block diagram with an example user equipment capable of being used with the systems and methods in the embodiments described herein.

Further, the above may be implemented by a UE. An example of a UE is described below with regard to FIG. 14. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 15:
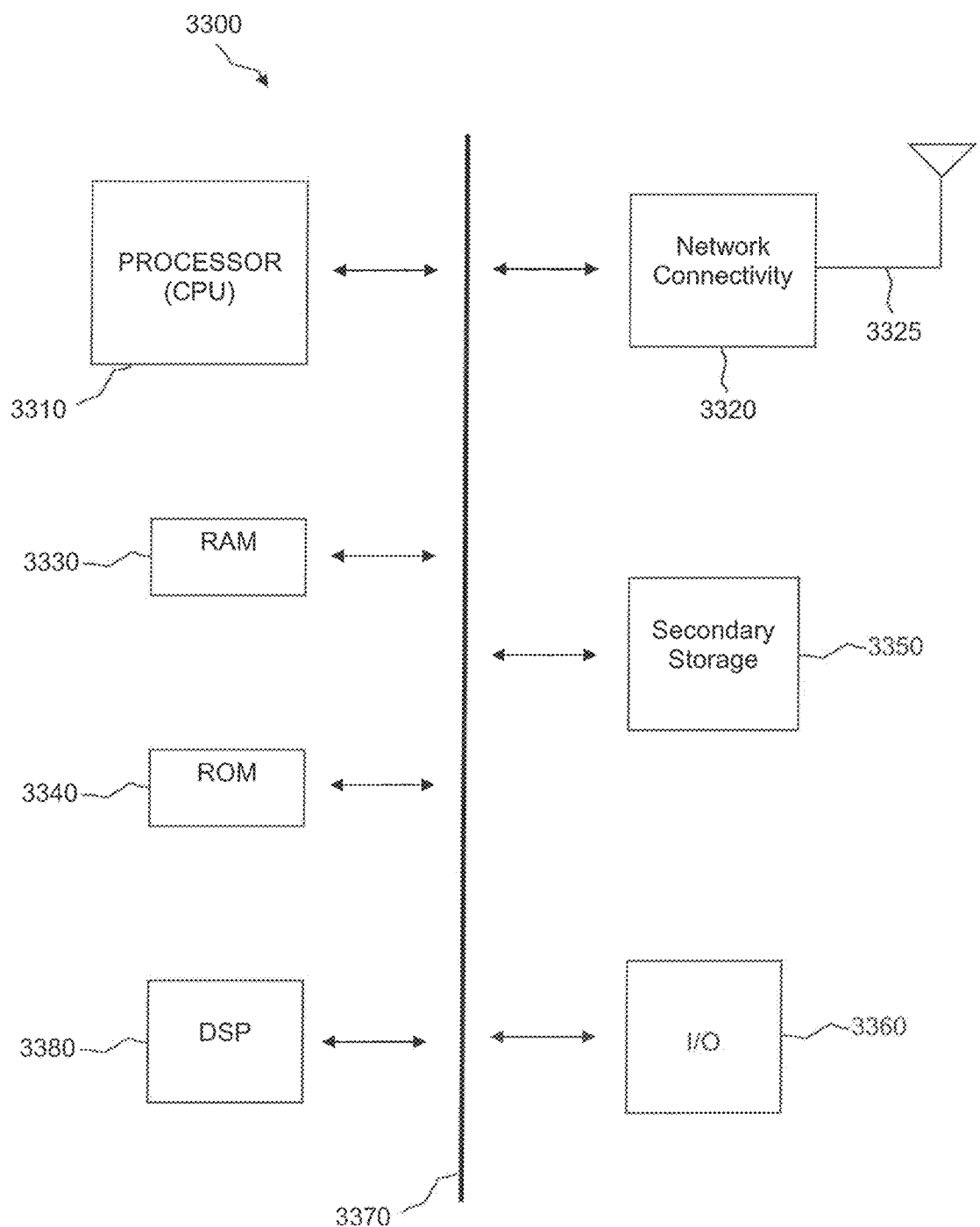
FIG. 15 illustrates a processor and related components suitable for implementing the several embodiments of the present disclosure.

The UE and other components described above might include a processing component that is capable of executing instructions related to the actions described above. FIG. 15 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS 36.101, 3GPP TS 36.300, 3GPP TS 36.213, 3GPP TR 36.932, and 3GPP TS 36.331.

In an embodiment, a method for communication in a wireless telecommunication system is provided. The method comprises transmitting, by a UE, an uplink signal to at least two cells, wherein the at least two cells have been assigned to the same timing advance group.

In another embodiment, a UE is provided. The UE comprises a processor configured such that the UE transmits an uplink signal to at least two network nodes that the UE has assigned to the same timing advance group.

In another embodiment, a network node is provided. The network node comprises a processor configured such that the network node assigns at least two cells to the same timing advance group, wherein the at least two cells use MAC scheduling.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by at least one processor for communication in a wireless telecommunication system, the method comprising:
    assigning a plurality of cells to a timing advance group (TAG); and
    in response to the assigning, signaling, to a user equipment (UE), the TAG and an association between the TAG and the plurality of cells, the plurality of cells assigned to the TAG comprising at least a first cell originating from a first network node and a second cell originating from a second network node separate from the first network node;
    wherein the second network node has a separate MAC (medium access control) scheduler from the first network node, wherein the second network node is an evolved Node B (eNB) having its own radio resource management (RRM) functionality.

2. The method of claim 1, wherein the UE is configured to establish simultaneous wireless connections with the first network node and the second network node.

3. The method of claim 1, wherein the first network node is a macro-cell eNB, and the second network node is a small-cell eNB.

4. The method of claim 1, wherein at least one of the first network node or the second network node is a macro-cell eNB that offloads user plane traffic to a small-cell eNB, wherein the UE is within coverage of the small-cell eNB.

5. The method of claim 4, further comprising transmitting, by the macro-cell eNB, a RadioResourceConfigDedicated message to the UE, the RadioResourceConfigDedicated message indicating a secondary TAG associated with the small-cell eNB.

6. The method of claim 1, further comprising:
    determining that the first cell has a first timing advance (TA) value and that the second cell has a second TA value; and forming the TAG upon determining that a difference between the first TA value and the second TA value is below a threshold.

7. The method of claim 1, further comprising:
determining a timing advance (TA) value of a third cell; and
adding the third cell to the TAG upon determining that the TA value of the third cell is similar to a TA value of at least the first cell or the second cell.

8. A first network node comprising:
at least one processor configured to:
assign a plurality of cells to a timing advance group (TAG); and
in response to the assigning, signal, to a user equipment (UE), the TAG and an association between the TAG and the plurality of cells, the plurality of cells assigned to the TAG comprising at least a first cell originating from the first network node and a second cell originating from a second network node separate from the first network node,
wherein the second network node has a separate medium access control (MAC) scheduler from the first network node, wherein the second network node is an evolved Node B (eNB) having its own radio resource management (RRM) functionality, wherein the UE is able to transmit data on the first cell and the second cell.

9. The first network node of claim 7, wherein the UE is configured to establish simultaneous wireless connections with the first network node and the second network node.

10. The first network node of claim 7, wherein the first network node is a macro-cell eNB, and the second network node is a small-cell eNB.

11. The first network node of claim 8, wherein at least one of the first network node or the second network node is a macro-cell eNB that offloads user plane traffic to a small-cell eNB, wherein the UE is within coverage of the small-cell eNB.

12. The first network node of claim 11, wherein the macro-cell eNB is configured to transmit a RadioResourceConfigDedicated message to the UE, the RadioResourceConfigDedicated message indicating a secondary TAG associated with the small-cell eNB.

13. A user equipment (UE) comprising:
at least one processor configured to:
receive signaling comprising a timing advance group (TAG) comprising at least a first cell originating from a first network node and a second cell originating from a second network node separate from the first network node, the signaling further comprising an association between the TAG and the first cell and the second cell,
wherein the second network node has a separate medium access control (MAC) scheduler from the first network node, wherein the second network node is an evolved Node B (eNB) having its own radio resource management (RRM) functionality, wherein the UE is able to transmit data on the first cell and the second cell.

14. The UE of claim 13, wherein the UE is configured to establish simultaneous wireless connections with the first network node and the second network node.

15. The UE of claim 13, wherein the first network node is a macro-cell eNB, and the second network node is a small-cell eNB.

16. The UE of claim 13, wherein at least one of the first network node or the second network node is a macro-cell eNB that offloads user plane traffic to a small-cell eNB, wherein the UE is within coverage of the small-cell eNB.

17. The UE of claim 16, wherein the UE is configured to receive, from the macro-cell eNB, a RadioResourceConfigDedicated message, the RadioResourceConfigDedicated message indicating a secondary TAG associated with the small-cell eNB.

* * * * *